D. P. Chamberlin,
Pruning Implement.
N° 29,669.     Patented Aug. 21, 1860.
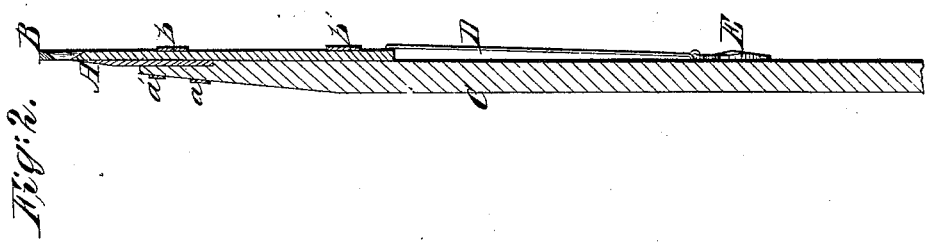
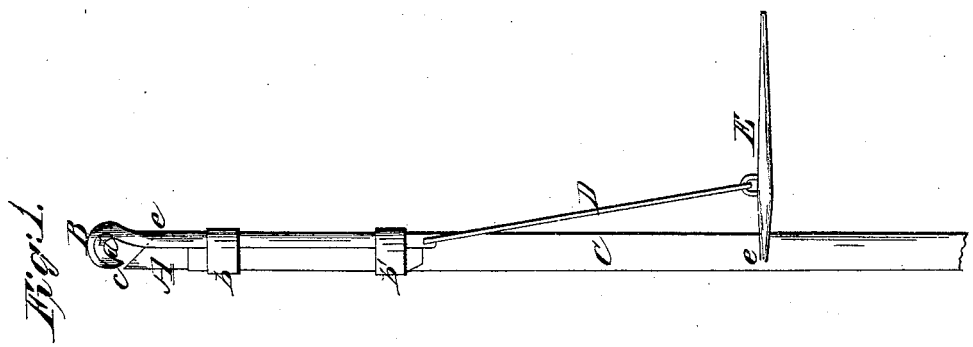
Witnesses:
A. E. Gale
C. G. Allen
Inventor:
D. P. Chamberlin
pr his attorney
J. D. Gale

UNITED STATES PATENT OFFICE.

DAVID P. CHAMBERLIN, OF HUDSON, MICHIGAN.

INSTRUMENT FOR PRUNING TREES.

Specification of Letters Patent No. 29,669, dated August 21, 1860.

*To all whom it may concern:*

Be it known that I, DAVID P. CHAMBERLIN, of the borough of Hudson, in the county of Lenawee and State of Michigan, have invented a new and Improved Instrument for Pruning Trees; and I hereby declare that the following is a full and sufficient description thereof, reference being had to the accompanying drawings, making part of the same.

The nature of the invention consists in an arrangement of a cutting hook in combination with an oblique-edged cutting chisel, the two parts operating together in the manner hereinafter described.

In the accompanying drawings let Figure 1, represent a side view of the hook and chisel and Fig. 2 an edge view of the same, the hook looking toward the spectator.

A is the oblique edged chisel the bevel side being behind.

B is the cutting hook with the bevel toward the spectator.

C, is the handle of the chisel, the lower part not being represented.

D is the metallic or other link connecting the shank of the hook with the staple of the lever handle.

E is the lever handle by which the hook B and chisel A are operated together in the way now to be stated.

(*a*) and (*a'*) are screw bolts that hold the chisel firmly to the handle by passing through its shank.

(*b*, *b'*,) are ferrules, through which slides the shank of the hook B, made fast to the wood by means of screws to the wood of the upper part of the handle.

(*c*, *c'*,) represent the line of the cutting edge of the chisel as seen on the plane side thereof.

(*d*) represents the cutting edge of the hook on the beveled side thereof.

Both the hook and chisel are made of fine steel and both are ground to a fair cutting edge and produce when operated together a confined shear cut. The hook being confined to a longitudinal sliding motion, performs its part of the cutting by the pressure of its cutting edge (*d*) obliquely against the cutting edge of the chisel, A, the power being applied by the leverage of the lever handle E, which is pivoted at (*e*).

The link D may be long enough to reach to the hand of the operator as here represented, or there may be a connecting rod attached to the handle E and extended to the hand of the operator.

Operation: To use this instrument, grasp the handle C firmly in the left hand and raise the same to the young shoot that is to be pruned until the shoot is received within the hook, the space being made wider if necessary by raising the lever arm E; and when the limb or shoot to be severed is received in place, the left hand still grasping firmly the handle or shaft, the right hand firmly grasping the lever E, and pulling down at the same instant, severs the shoot or limb with great ease, and perfection of cut.

I would remark that I am fully aware of the use of pivoted shears for pruning trees, whether with straight or curved blades, and that I disclaim such devices confining my claim to the elements of the chisel and hook, as above set forth.

Having fully described the nature of the invention and the mode of operating the instrument, what I claim as my invention, and desire to secure by Letters Patent, is—

The combination of the oblique cutting blade with the cutting hook, the parts being arranged and operated substantially as and for the purpose set forth.

DAVID P. CHAMBERLIN.

Witnesses:
E. D. KIDDER,
B. H. LANE.